(12) United States Patent
Kochura et al.

(10) Patent No.: US 11,042,230 B2
(45) Date of Patent: Jun. 22, 2021

(54) COGNITIVE STYLUS WITH SENSORS

(71) Applicant: International Business Machines Corporation, Armonk, NY (US)

(72) Inventors: Nadiya Kochura, Bolton, MA (US); Shikhar Kwatra, Durham, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/676,234

(22) Filed: Nov. 6, 2019

(65) Prior Publication Data

US 2021/0132710 A1    May 6, 2021

(51) Int. Cl.

| | | |
|---|---|---|
| *G06F 3/0346* | (2013.01) |
| *G06F 3/0354* | (2013.01) |
| *G06N 20/00* | (2019.01) |
| *G06F 3/038* | (2013.01) |
| *G06F 9/451* | (2018.01) |

(52) U.S. Cl.
CPC ........ *G06F 3/03545* (2013.01); *G06F 3/0346* (2013.01); *G06F 3/0383* (2013.01); *G06F 3/03547* (2013.01); *G06F 9/451* (2018.02); *G06N 20/00* (2019.01)

(58) Field of Classification Search
CPC ............. G06F 3/03545; G06F 3/03546; G06F 3/03547; G06F 3/0354; G06F 3/0383; G06F 3/0346; G06F 3/0362
See application file for complete search history.

(56) References Cited

U.S. PATENT DOCUMENTS

| | | | |
|---|---|---|---|
| 9,367,161 B2 | 6/2016 | Havilio | |
| 9,542,013 B2 | 1/2017 | Dearman | |
| 9,870,083 B2 | 1/2018 | Hinckley | |
| 2012/0331546 A1 | 12/2012 | Falkenburg | |
| 2013/0106760 A1* | 5/2013 | Pedersen | G06F 3/04162 345/174 |
| 2013/0257777 A1 | 10/2013 | Benko | |
| 2014/0152576 A1* | 6/2014 | Kim | G06F 3/0304 345/169 |
| 2015/0363034 A1* | 12/2015 | Hinckley | G06F 3/04883 345/173 |
| 2016/0357274 A1* | 12/2016 | Ahn | G06F 1/1643 |

(Continued)

FOREIGN PATENT DOCUMENTS

KR    100769981 B1    10/2007

OTHER PUBLICATIONS

"A digital pen that can do it all," Windows Ink, Microsoft, accessed Oct. 22, 2019, 4 pages. <https://www.microsoft.com/en-us/windows/digital-smart-pen>.

(Continued)

*Primary Examiner* — Robert J Michaud
(74) *Attorney, Agent, or Firm* — Grant M. McNeilly

(57) ABSTRACT

A stylus device includes a body, a processor connected to the body, a memory unit connected to the body and communicatively connected to the processor, and a rotational sensor connected to the body and communicatively connected to the processor. The processor is configured to send rotational data to a stylus application, and the stylus application uses the rotational data to select a destination for information in a computing device.

20 Claims, 6 Drawing Sheets

(56) References Cited

U.S. PATENT DOCUMENTS

2018/0253163 A1   9/2018   Berger, Jr.

OTHER PUBLICATIONS

"Surface Pen—Platinum," Microsoft Store, accessed Oct. 22, 2019, 7 pages.<https://www.microsoft.com/en-us/p/surface-pen/8zl5c82qmg6b?activetab=pivot:overviewtab>.
Mell et al., "The NIST Definition of Cloud Computing," Recommendations of the National Institute of Standards and Technology, U.S. Department of Commerce, Special Publication 800-145, Sep. 2011, 7 pages.
Wang et al., "A Method of Using Stylus Input Characteristics to Perform User Identification, Content Categorization and Search," IP.com, Disclosure No. IPCOM000232597D, Nov. 19, 2013, 3 pages. <https://priorart.ip.com/IPCOM/000232597>.

* cited by examiner

COGNITIVE STYLUS WITH SENSORS

BACKGROUND

The present invention relates to computer input devices, and more specifically, to a cognitive input device having sensors.

Computing devices often have interfaces that involve input devices so that users can interact with them. Some traditional computer input devices, such as keyboards and mice, have hard keys. Hard keys typically have a functionality that remains the same when used with a given application. For example, the "w" key in a word processing program inputs a "w" where the cursor is located, and in a computer game, "w" can move the player forward. Some other traditional computer input devices, such as those with touch screens, use soft keys. Soft keys can appear and disappear according to the context and functionality that the user is working with, so typically include a label that indicates what their functionality is.

SUMMARY

According to some embodiments of the present disclosure, a stylus device includes a body, a processor connected to the body, a memory unit connected to the body and communicatively connected to the processor, and a rotational sensor connected to the body and communicatively connected to the processor. The processor is configured to send rotational data to a stylus application, and the stylus application uses the rotational data to select a destination for information in a computing device.

According to some embodiments of the present disclosure, a computing environment includes a computing device, a target application running on the computing device, a stylus application communicatively connected to the target application, and a stylus device communicatively connected to the stylus application. The stylus device includes a rotational sensor that produces rotational data, and the stylus application uses the rotational data from the stylus device to select a destination for information in the computing device.

According to some embodiments of the present disclosure, a method of inputting data to a computing device includes receiving, by a stylus application, rotational data from a stylus device having one or more rotational sensors, the rotational data indicating rotation and/or a rotational position of the stylus device. The method further includes selecting, by the stylus application, one of a plurality of sectors around the stylus device based on the rotation and/or rotational position of the stylus device, wherein each of the plurality of sectors corresponding to a respective one of a plurality of user input options. The method further includes communicating, by the stylus application and to a target application, the user input option corresponding to the selected sector.

DETAILED DESCRIPTION

Figure 1:
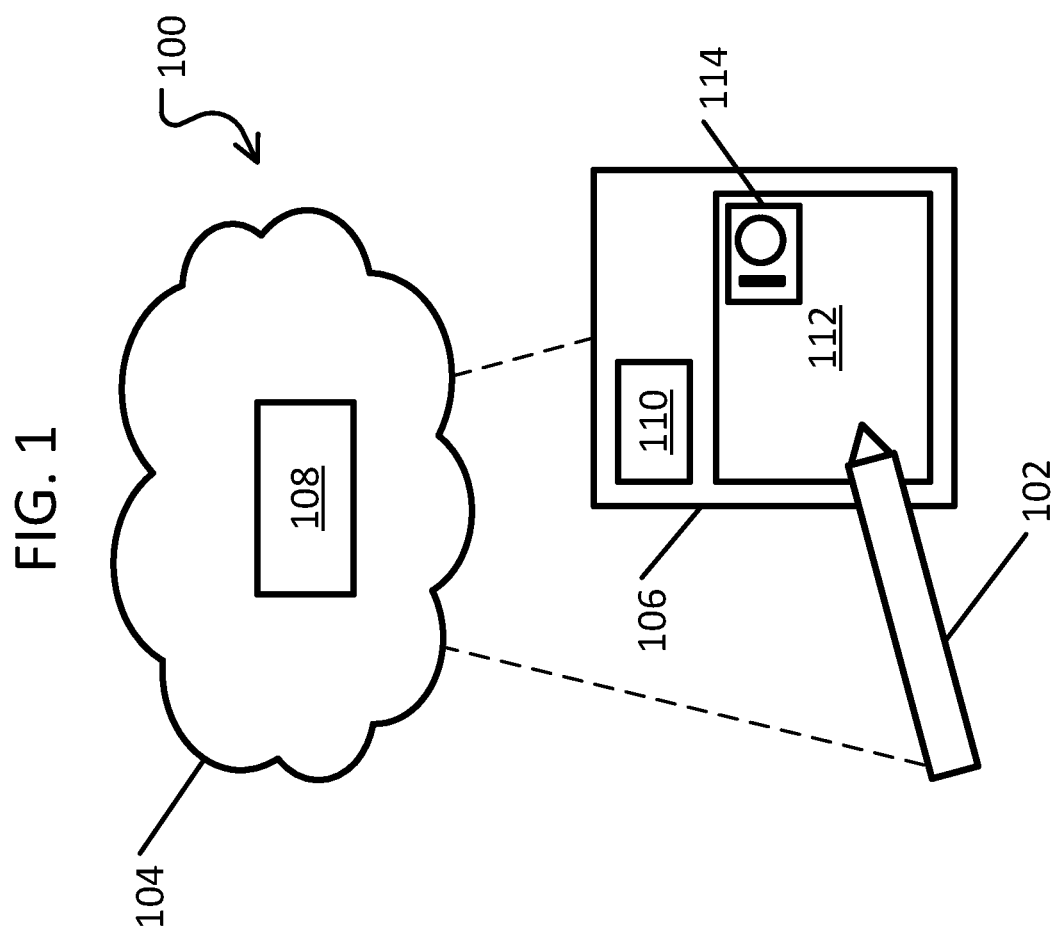
FIG. 1 is a schematic view of a computing environment including a cognitive stylus according to an embodiment of the present disclosure.

FIG. 1 is a schematic view of computing environment 100 including stylus 102 according to an embodiment of the present disclosure. Computing environment 100 also includes cloud 104 and computing device 106. Thereby, stylus 102 can control computing device 106 in the conventional manner (e.g., by touch) as well as through data communication.

More specifically, stylus 102 is communicatively connected to stylus application 108 which is located in and run by cloud 104, in this example. Computing device 106 is also communicatively connected to cloud 104, and computing device 106 includes target application 110, which is the application that the user (not shown) is currently interacting with. Computing device 106 displays a graphical user interface for target application 110 on touch screen 112. In addition, computing device 106 displays dashboard 114 that indicates the functionality and/or status of stylus 102. Thereby, the user can more effectively interact with target application 110 via stylus 102. In other embodiments, stylus application 108 is run directly on computing device 106, allowing stylus 102 to be used without cloud 104.

Figure 2:
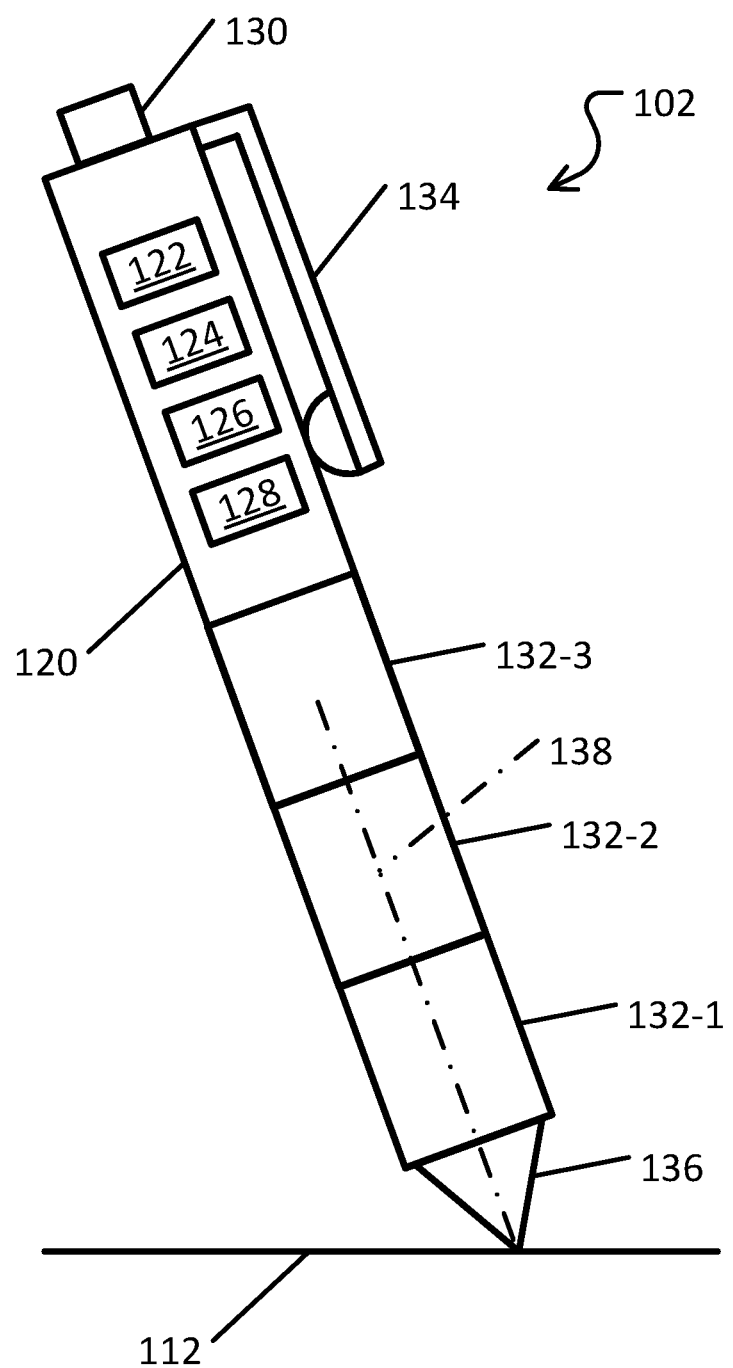
FIG. 2 is a schematic view of the cognitive stylus with sensors according to an embodiment of the present disclosure.

FIG. 2 is a schematic view of stylus 102 according to an embodiment of the present disclosure. In the illustrated embodiment, stylus 102 includes body 120 and processor 122, memory unit 124, communication module 126, rotational sensor 128, switch 130, touch sensors 132-1, 132-2, and 132-3 (collectively, "touch sensors 132"), clip 134, and tip 136 that are connected to body 120. Furthermore, memory unit 124, rotational sensor 126, communication module 128, switch 130, and touch sensors 132 are communicatively connected to processor 122.

Processor 122, memory unit 124, and communication module 126 can be any suitable separate components, or they can be parts of any suitable integrated computing device. Rotational sensor 128 can be any suitable device that can sense rotational position (e.g., with respect to the planet's gravitational pull) and/or angular velocity and/or acceleration about longitudinal axis 138 of stylus 102 and/or about an axis (not shown) that is perpendicular to longitudinal axis 138 (e.g., the angle at which stylus 102 is presented to touch screen 112). For example, rotational sensor 128 can comprise an accelerometer, a magnetic sensor, and/or a camera.

Switch 130 and touch sensors 132 can be devices that sense the touch of the user. In some embodiments, switch 130 is a push-button that is activated in a similar manner to that of a traditional retractable pen (not shown). Activating switch 130 can turn processor 122, memory unit 124, communication module 126, rotational sensor 128, and/or touch sensors 132 on or off, although in some embodiments, switch 130 can be used for other features such as selection (as described below). In some embodiments, touch sensors 132 are similar to touch screen 112. Each of touch sensors 132 is arranged circumferentially around the exterior of body 120, such that touch sensors 132 form a linear array of sensors along body 120. Thus, the user can place their fingers thereon when holding stylus 102 and activate one or more touch sensors 132. More specifically, in this example, touch sensor 132-1 is positioned at the bottom of body 120 adjacent to tip 136, touch sensor 132-2 is positioned above and adjacent to touch sensor 132-1, and touch sensor 132-3 is positioned above and adjacent to touch sensor 132-2.

The components and configuration of stylus 102 can allow for the user to provide inputs to computing device 106 (shown in FIG. 1). Such inputs can include contact with computing device 106 via tip 136 as well as rotational data from rotational sensor 128, activation data from switch 130, and touch data from touch sensors 132 via, for example, cloud 104 (shown in FIG. 1). In alternative embodiments, stylus 102 can have additional, omitted, and/or different components and/or stylus 102 can have different configurations. For example, stylus 102 can include a wireless interface for communicating directly with the computing device 106 over a short-range network, such as, but not limited to, Bluetooth® or near-field communication, in order to provide the inputs to computing device 106. Additionally, it is to be understood that the stylus can include other wireless interfaces for communicating over other wireless networks, such as Wi-Fi, in order to communicate over the internet with stylus application 108 located and run in cloud 104.

Figure 3:
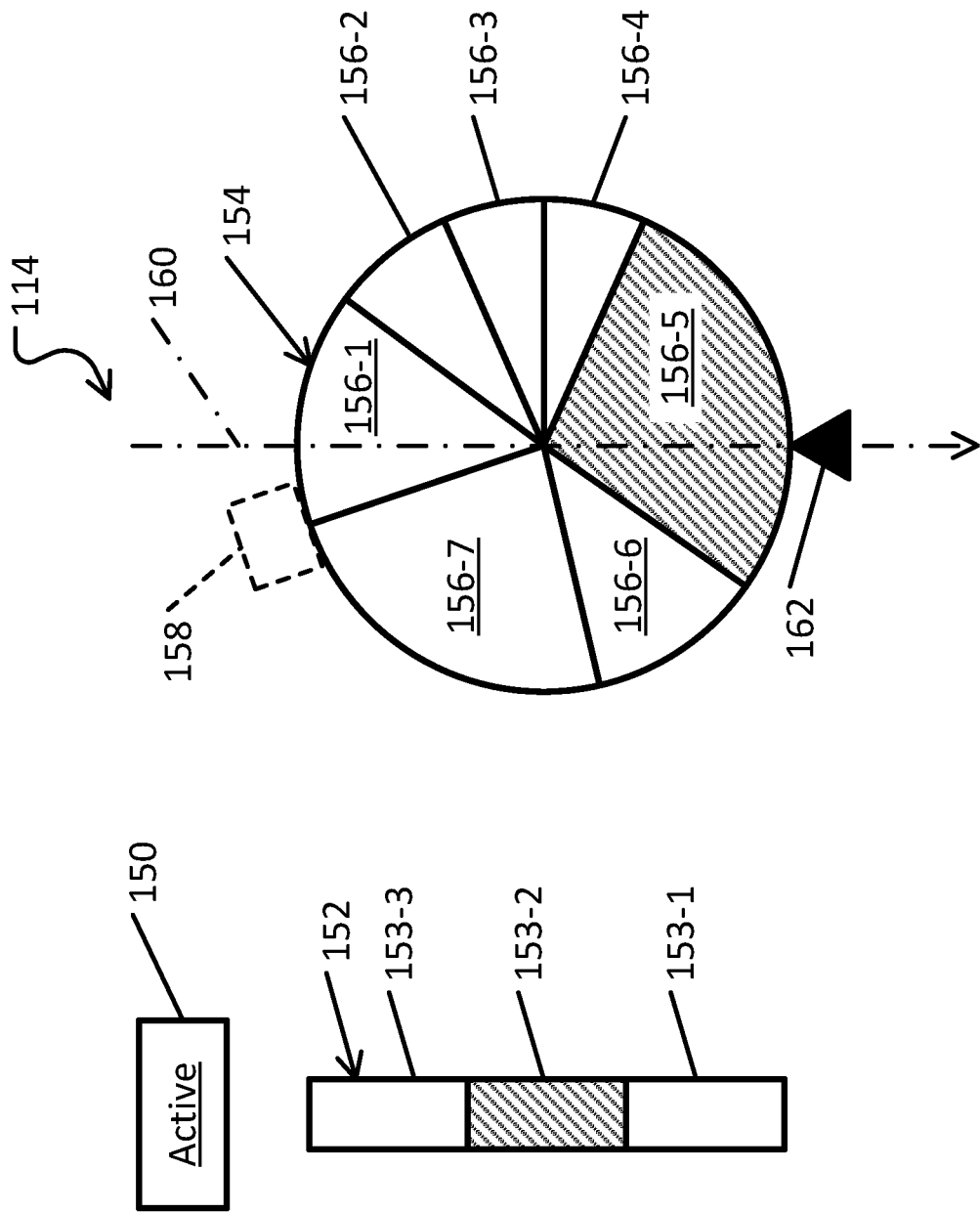
FIG. 3 is a graphical view of a dashboard for the cognitive stylus.

FIG. 3 is a graphical view of dashboard 114 for stylus 102 (shown in FIG. 2). As shown in FIG. 1, dashboard 114 can be displayed on computing device 106 when the user is using stylus 102. In some embodiments, dashboard 114 is at least part of the graphical user interface for stylus application 108 (shown in FIG. 1).

In the illustrated embodiment, dashboard 114 comprises switch indicator 150, touch indicator 152, and rotation indicator 154. Switch indicator 150 can indicate whether switch 130 (shown in FIG. 2) is activated, and touch indicator 152 can indicate which of touch sensors 132 (shown in FIG. 2) are activated. The indications can be evident by, for example, using hashing, highlighting, outlining, color, and/or brightness. Touch indicator 152 is divided into sections 153-1, 153-2, and 153-3 (collectively, "sections 153") that correspond to touch sensors 132-1, 132-2, and 132-3, respectively. As shown, section 153-2 is highlighted, which indicates that touch sensor 132-2 is activated.

Similarly, rotation indicator 154 is divided into sectors 156-1 through 156-7 (collectively, "sectors 156") and can include clip indicator 158 to aid the user in relating rotation indicator 154 with the physical stylus 102 that they are holding. Sectors 156 indicate various options or functions that can be selected by rotating stylus 102. In some embodiments, sectors 156 represent destinations for information from target application 110 (shown in FIG. 1). The destinations can be, for example, other people (e.g., friends, relatives, coworkers) and/or organizations (e.g., groups of people, companies, forums). Similarly, the destinations can allow access to the information by other people and/or organizations, even if the information isn't sent elsewhere. This allows for a user to rapidly address content that is being created without needing to type out and/or search for destinations. Additionally, in other embodiments, the sectors 156 can represent other user input options, such as but not limited to, textual statements (e.g. "Hello", "How are you?", "Thanks!", etc.), textual formatting options (e.g. "bold", "underline", etc.), URL addresses, etc. The user input options can be pre-selected, manually entered by the user a priori, and/or determined automatically based on user history. For example, if a user commonly uses certain phrases or visits certain websites, those common phrases, websites, etc. can be selected as options to be associated with the sectors 156.

In the illustrated embodiment, the user has rotated stylus 102 to select sector 156-5. In some embodiments, this occurs by the user holding stylus 102 in a conventional manner such that stylus 102 is not completely vertical. Thereby, the force of gravity will have a vector that is angled with respect to longitudinal axis 138 (shown in FIG. 2). The component of the force of gravity that is perpendicular to longitudinal axis 138 can be used to determine the bottommost point of stylus 102. The sector 156 that includes the bottommost point can be the selected sector in some embodiments. Dashboard 114 can reflect the orientation of stylus by showing gravity direction 160 and/or can indicate which sector 156 will be selected using caret 162. Once the selection has been made, dashboard 114 can indicate it, for example, using hashing, highlighting, outlining, color, and/or brightness. In other embodiments, caret 162 is the topmost position or in a user-selected position. In other embodiments, moving (i.e., displacing and/or accelerating) stylus 102 towards a particular sector 156 selects that sector. In such embodiments, a user pulling stylus 102 towards themselves selects sector 156-5, whereas moving stylus 102 left selects sector 156-7. In some embodiments, multiple sectors 156 can be selected, for example, by touching switch 130 and/or one or more touch sensors 132 in between selecting different sectors 156.

In the illustrated embodiment, a single rotation indicator 154 is displayed in dashboard 114. However, stylus application 108 can include multiple rotation indicators 154 (each with different options, functions, and/or sector sizes/locations), and multiple rotation indicators 154 can be displayed in dashboard 114. Which rotation indicators 154 are displayed can be based on, for example, which target application 110 is being used (i.e., stylus application 108 matches rotation indicator(s) 154 with each target application 110) and/or which of touch sensors 132 are activated (i.e., stylus application 108 matches rotation indicator(s) 154 with each touch sensor 132 or combination thereof).

In some embodiments, rotation indicator 154 (and alternative rotation indicators 154, if available) can be modified manually by interacting with stylus application 108, for example, through any target application 110 or through a specific target application 110 that is solely related to stylus 102. For example, the sizes and locations of sectors 156 can be changed, as well as meanings (e.g., options, functions, destinations, etc.) that each sector 156 represents.

In addition, or in the alternative, stylus application 108 can automatically adjust a rotation indicator 154 through cognitive learning, for example, slowly over time (e.g., several uses) or in real-time (e.g., similar to an automatic filling function for blanks in forms). This cognitive learning can occur using, for example, historical data from rotational sensor 128, switch 130, and touch sensors 132 as well as the user's preferences and previous actions taken using stylus 102. The cognitive learning of the user's heuristics can occur via, for example, pattern sequencing via a long-short term memory recurrent neural networks (LSTM-RNN) model approach and/or a machine learning model (e.g., reinforcement learning). Thus, stylus application 108 can base the sizes, locations, meanings and/or preselections on, for example, past selections that the user has made and/or the current content of target application 110. For example, if the user has made a particular selection seventy-five percent of the previous times that stylus 102 was used in conjunction with target application 110, then the sector 156 related to that selection can be enlarged, moved to a location that is easy to select (e.g., bottom-dead-center if that is where selections are made), and/or preselected. In addition, if two selections have been frequently made during previous times that stylus 102 was used in conjunction with target application 110, then the sectors 156 related to those two sections can be moved to be adjacent to one another.

An example of the current content of target application 110 being used as a basis for the sizes, locations, meanings and/or preselections of sectors 156 is the situation where the user interface of target application 110 indicates a certain subject matter. In such an example, a header, subject line, greeting, main text/image/drawing, and/or signature can indicate what is being conveyed through target application 110. Thereby, possible likely destinations can be predicted based on the indication of what is being created and/or performed in target application 110.

Cognitive learning by stylus application 108 to make suggestions and/or preselections can occur in many different types of situations. For example, target application 110 can be word processing, presentation making, technical drafting, drawing software, collaboration software (e.g., GitHub®), or communication software (e.g., email or instant messaging), and the suggested and/or preselected destinations can be recipients (e.g., individuals or groups), storage locations, and/or access/editing permissions. For a more specific example, if a user is using target application 110 to type an email with the subject line being "Construction Project 97", then stylus application 108 can review previous messages from target application 110 relating to Construction Project 97. If the first line of the message is "Dear Jolene and Mike:" then stylus application 108 can review the user's contact list for people named Jolene and Mike. These two analyses can be cross-referenced so that when the user clicks on the "To" line with stylus 102, the likely recipients can be located adjacent to each other at or near the selection indicator in rotation indicator 154.

Thereby, the context and content of the situation in which the user is using stylus 102 can be used to inform stylus application 108 so that stylus application 108 can be easier and faster to use in the future. While FIG. 3 demonstrates this using dashboard 114, dashboard 114 may not always be present in touch screen 112 (shown in FIG. 1). Instead, dashboard 114 may be turned on and off, or dashboard 114 may be absent altogether in particular target applications 110. In such embodiments, the principle of the rotational and linear regions of stylus 102 being used for selection of destinations would still exist, but display of the selections may occur in target application 110 itself (e.g., in the "To" line of an email). Additionally, in other embodiments, the dashboard 114 may be presented differently from the example shown in FIG. 3. For example, in some embodiments, only sections 153 of touch indicator 152 are shown. In some such embodiments, each of sections 153 is associated with a different destination (e.g., application, recipients, etc.) for data similar to sectors 156 in rotation indicator 154 discussed above. Thus, in some such embodiments, sections 153 can be used in addition to or in lieu of sectors 156.

Figure 4:
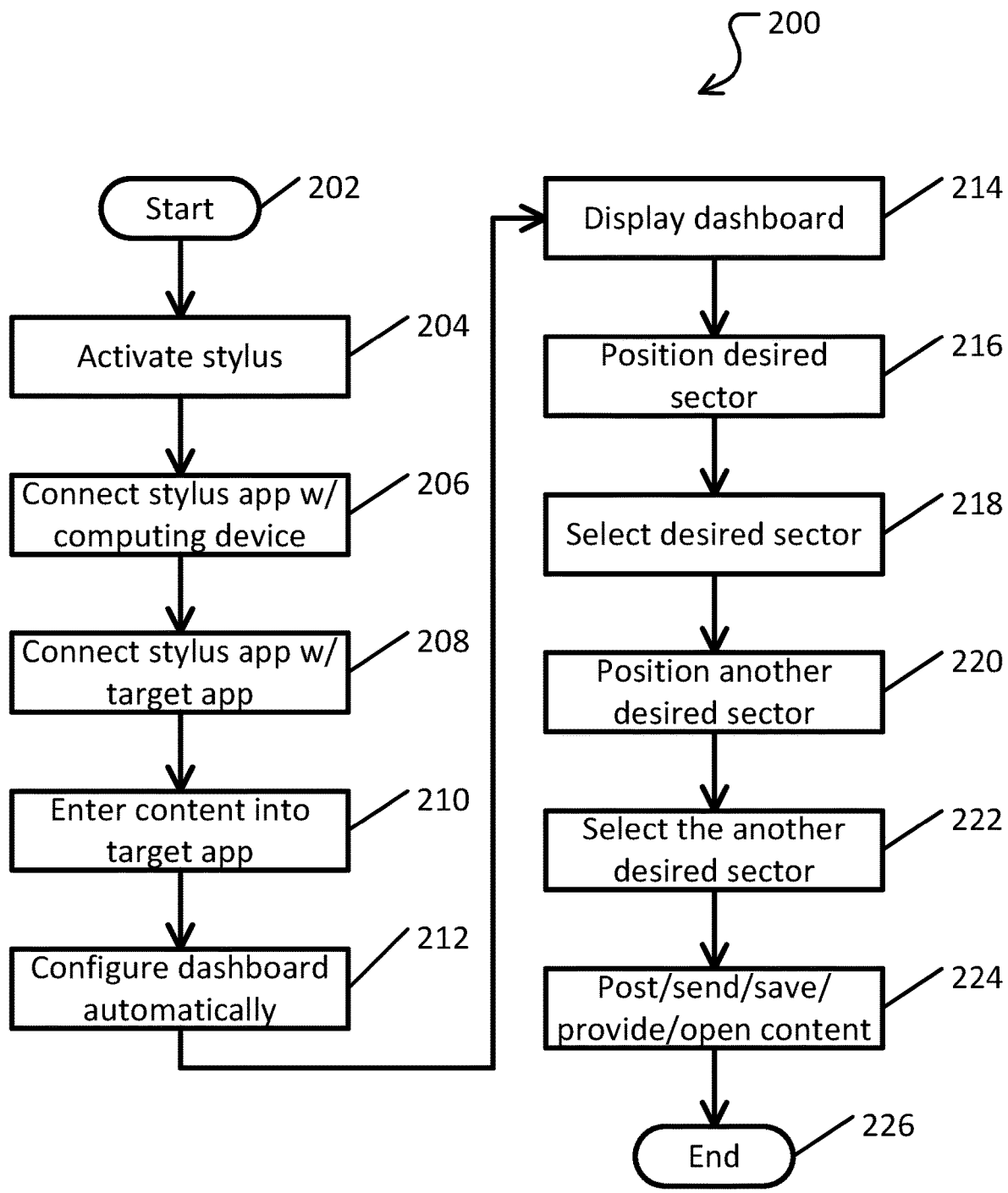
FIG. 4 is a flowchart of a method of using the cognitive stylus according to an embodiment of the present disclosure.

FIG. 4 is a flowchart of method 200 of using the cognitive stylus according to an embodiment of the present disclosure. In describing method 200, references will be made to some of the components shown in FIGS. 1-3.

Method 200 begins at block 202. At block 204, stylus 102 is activated (for example, by holding down switch 130 for a long period of time), and stylus 102 is communicatively connected with stylus application 108, for example, by the user. At block 206, stylus application 108 is communicatively connected with computing device 106. At block 208, stylus application 108 is communicatively connected with target application 110. At block 210, content is entered into target application 110, for example, using stylus 102 and/or a keyboard (not shown).

At block 212, dashboard 114 is configured automatically, which can include setting positions, sizes, meanings and/or preselections of sectors 156 in rotation indicator 154, for example, by the stylus application 108 as discussed above. Alternatively, the dashboard 114 can be configured or updated manually, in some embodiments. At block 214, dashboard 114 is displayed on computing device 106. As noted above, in some embodiments, the dashboard 114 is not displayed. Thus, in some such embodiments, blocks 212 and 214 can be omitted.

At block 216, rotation and/or gripping/touching of the stylus 102 by a user is detected by sensors. Thus, the user can position a desired sector 156 into a selection position (e.g., proximate caret 162). That is, sensors in the stylus 102 (e.g. rotational sensor(s), touch sensors, etc.) collect user input (e.g. measured rotation, touch interaction, etc.). The measured data or collected user input is provided to the stylus application which associates the measured data with respective possible user input options, as discussed above. For example, the rotational data can indicate a rotational position of the stylus. The rotational position of the stylus is associated with one of a plurality of sectors around the stylus, as discussed above. Also, as discussed above, each of the sectors corresponds to a possible user input option (e.g. destination, text, formatting option, URL, etc.). Additionally, as discussed above, the user input options associated with the measured data can be set manually by a user and/or set automatically by the stylus application.

At block 218, the desired sector 156 is selected, for example, by the user briefly depressing switch 130. In particular, one or more of the user input options is selected based on the rotational position of the stylus 102. For example, a sector 156 corresponding to the rotational position of the stylus, (e.g. the bottommost, topmost, etc.) is selected. That sector 156 can be selected in response to the stylus being in the measured rotational position for a threshold period of time and/or in response to additional sensor inputs from the stylus, such as but not limited to, depression of the switch 130 or touch of one or more touch sensors 132. At block 220, stylus 102 is rotated and/or gripped/touched to position another desired sector 156 into a selection position (e.g., proximate caret 162) by the user. At block 222, the another desired sector 156 is selected, for example, by the user briefly depressing switch 130. At block 224, input is given to computing device 106, for example, using stylus 102 or a keyboard, to post/send/save/provide/open the current content of target application 110, for example, to other users/organizations/entities. For example, the stylus application 108 provides the user input option corresponding to the selected sector (e.g. user email address, device address, etc.) to the target application 110. Additionally, as discussed herein, the computing device 106 can run multiple target applications 110 and, in some embodiments, the measured data from the stylus 102 can also be used to select the target application 110 to which the selected user input option is to be communicated. At block 226, method 200 ends.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
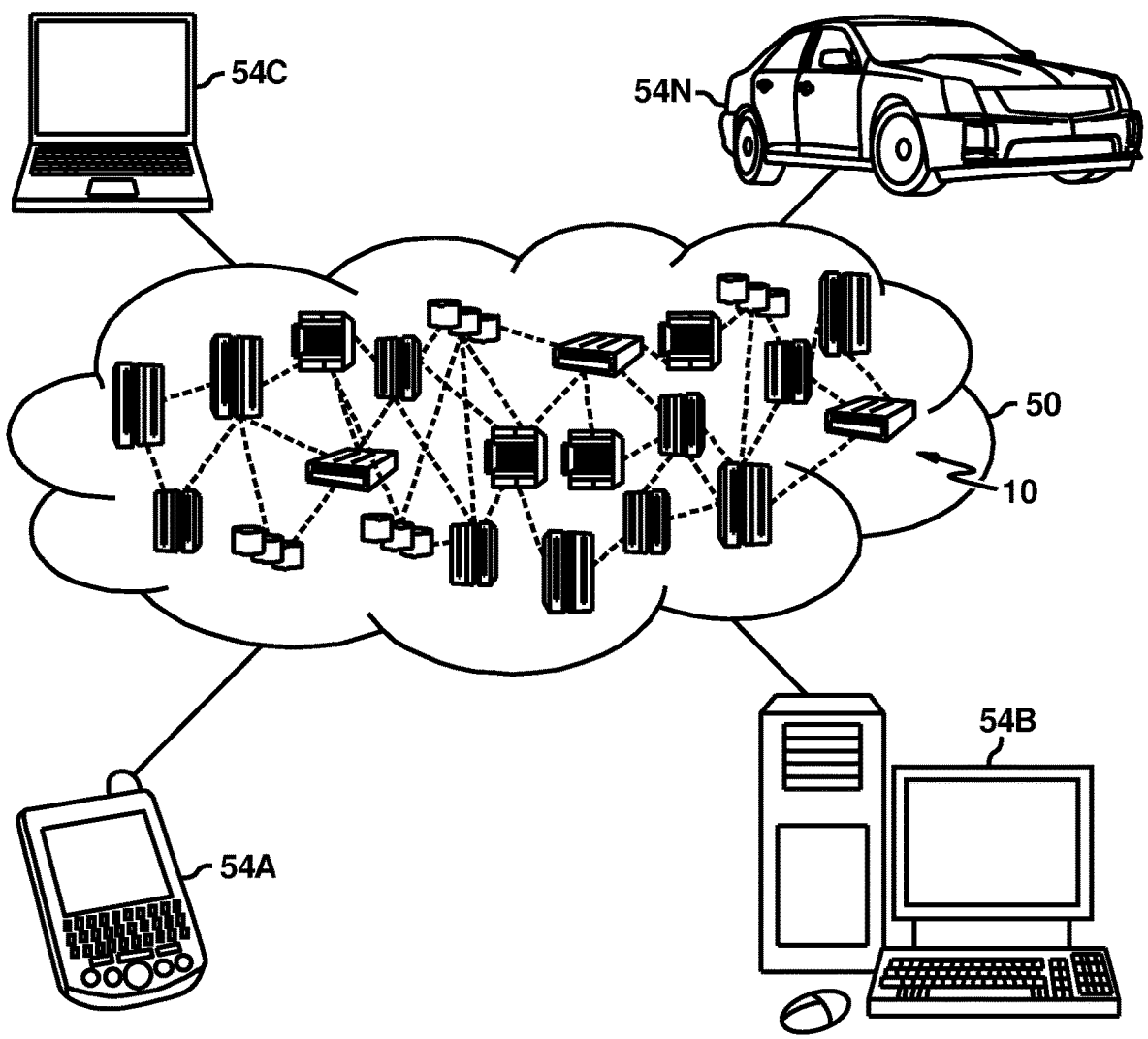
FIG. 5 is a schematic view of a cloud computing environment according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
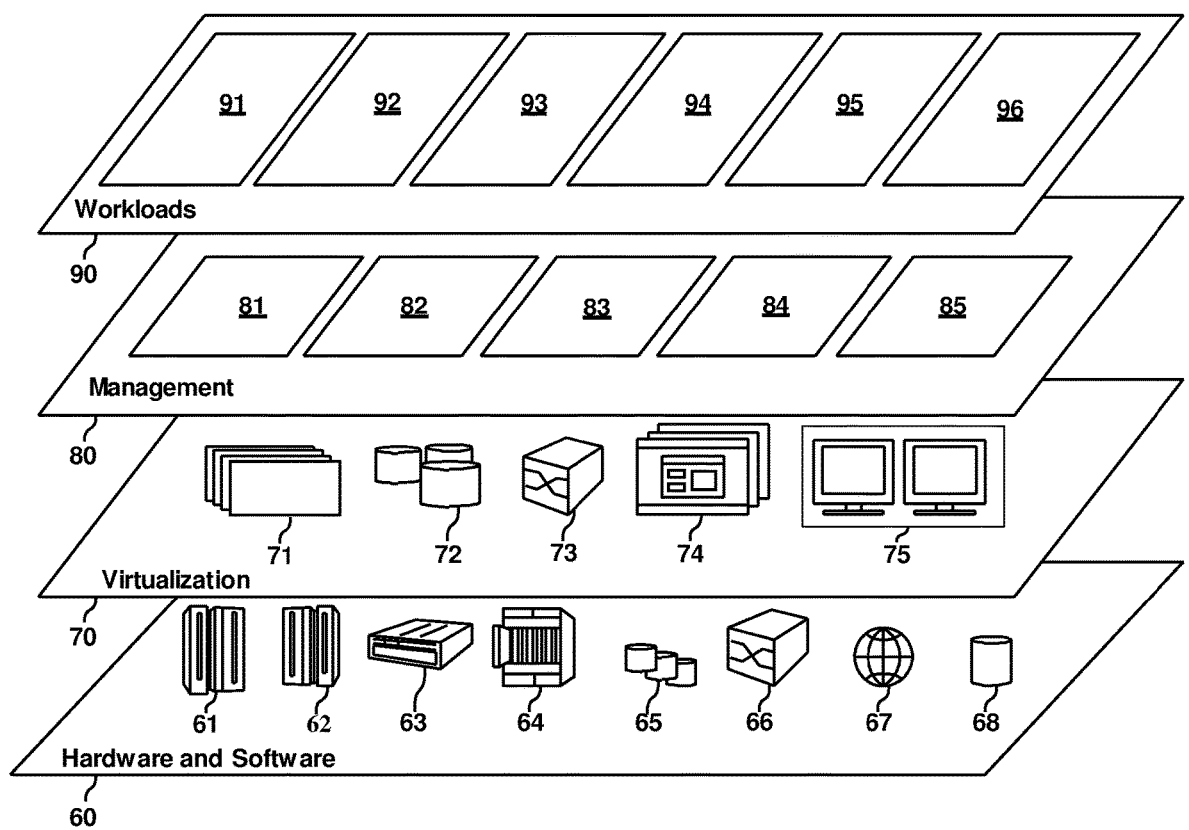
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stylus software 96 (such as stylus application 108).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A stylus device comprising:
a body;
a processor connected to the body;
a memory unit connected to the body and communicatively connected to the processor; and
a rotational sensor connected to the body and communicatively connected to the processor;
wherein the processor is configured to send rotational orientation data to a stylus application; and
wherein the stylus application correlates a plurality of sectors with a plurality of different positions, respectively, around a longitudinal axis of the body;
wherein the plurality of sectors corresponds to a plurality of user input options, respectively; and
wherein the stylus application uses the rotational data to select a destination for information in a computing device.

2. The stylus device of claim 1, further comprising:
a touch sensor connected to an exterior of the body and communicatively connected to the processor.

3. The stylus device of claim 2, wherein activation of the touch sensor causes the processor to send the rotational orientation data to the stylus application.

4. The stylus device of claim 1, further comprising:
a first touch sensor connected to an exterior of the body at a first position and communicatively connected to the processor; and
a second touch sensor connected to the exterior of the body at a second position that is adjacent to the first position and communicatively connected to the processor.

5. The stylus device of claim 1, wherein the rotational sensor is selected from the group consisting of: an accelerometer, a magnetic sensor, and a camera.

6. The stylus device of claim 1, wherein the rotational orientation data represents an orientation of the stylus with respect to gravity.

7. A computing environment comprises:
a computing device;
a target application running on the computing device;
a stylus application communicatively connected to the target application; and
a stylus device communicatively connected to the stylus application, the stylus device including a rotational sensor that produces rotational orientation data;
wherein the stylus application includes a dashboard that is displayed on the computing device and uses the rotational orientation data, wherein:
the dashboard comprises a first rotation indicator that is divided into a first plurality of sectors that correspond to a plurality of different positions around a longitudinal axis of a stylus device; and
each of the first plurality of sectors corresponds to a respective one of a plurality of user input options.

8. The computing environment of claim 7, wherein the stylus application automatically configures positions and/or sizes of at least one of the first plurality of sectors based on cognitive learning of historical data, and wherein the plurality of user input options corresponds to a plurality of destinations, respectively.

9. The computing environment of claim 7, wherein the stylus device comprises:
a processor communicatively connected to the rotational sensor; and
a memory unit communicatively connected to the processor.

10. The computing environment of claim 9, further comprising:
a touch sensor connected to an exterior of the body and communicatively connected to the processor.

11. The computing environment of claim 10, wherein activation of the touch sensor causes the processor to send the rotational orientation data to the stylus application.

12. The computing environment of claim 8, further comprising:
a first touch sensor connected to an exterior of the stylus device at a first position; and
a second touch sensor connected to the exterior of the stylus device at a second position that is adjacent to the first position.

13. The computing environment of claim 7, wherein the rotational sensor is selected from the group consisting of: an accelerometer, a magnetic sensor, and a camera.

14. The computing environment of claim 7, wherein the rotational orientation data represents an orientation of the stylus with respect to gravity.

15. The computing environment of claim 7, wherein the dashboard further comprises a second rotation indicator that is divided into a second plurality of sectors, wherein:
each of the second plurality of sectors corresponds to a respective one of the plurality of user input options;
the first plurality of sectors corresponds to a first type of user input options selected from the group consisting of: destinations, text, and formatting;

the second plurality of sectors corresponds to a second type of user input options selected from the group consisting of: destinations, text, and formatting; and
the first type is different from the second type.

16. The computing environment of claim 7, wherein:
the stylus device further comprises a plurality of touch sensors; and
the dashboard further comprises a touch indicator that is configured to indicate which of the plurality of touch sensors are activated.

17. A method of inputting data to a computing device, the method comprising:
configuring a plurality of sectors in a stylus application that correspond to a plurality of different positions around a longitudinal axis of a stylus device, wherein each of the plurality of sectors corresponds to a respective one of a plurality of user input options;
receiving, by a stylus application, rotational data from the stylus device having one or more rotational sensors, the rotational data indicating a rotational orientation of the stylus device;
selecting, by the stylus application, one of the plurality of sectors based on the rotational orientation of the stylus device; and
communicating, by the stylus application and to a target application, the user input option corresponding to the selected one of the plurality of sectors.

18. The method of claim 17, further comprising:
learning, by the stylus application, a user's preferences and previous actions taken using the stylus device; and
reconfiguring, automatically by the stylus application, positions and/or sizes of at least one of the plurality of sectors based on the learning of the user's preferences and previous actions taken using the stylus device;
wherein the plurality of user input options corresponds to a plurality of destinations, respectively.

19. The method of claim 17, further comprising:
displaying a dashboard on a user interface of the computing device, the dashboard indicating the plurality of sectors and the rotational orientation of the stylus device based on the received rotational data.

20. The method of claim 17, wherein the plurality of user input options represent a plurality of users, respectively, who will receive and/or be granted access to information on the computing device if selected.

* * * * *